Patented Aug. 8, 1944

2,355,547

UNITED STATES PATENT OFFICE 2,355,547

FOOD COMPOSITION

Sidney Musher, New York, N. Y., assignor to Musher Foundation Incorporated, New York, N. Y., a corporation of New York No Drawing. Application December 7, 1943, Serial No. 513,295

13 Claims. (Cl. 99—93)

The present invention relates to stabilizers for food and other products as well as to stabilized food compositions as well as to the production of a novel oat product and particularly relates to stabilized frozen dessert and ice cream compositions having a relatively high viscosity when in liquid or melted condition as well as possessing good body and texture.

The present invention also relates to an unusual product capable of developing not only a high viscosity in aqueous dispersion but also capable of developing stable and unusual foam characteristics.

In producing food products such as ice cream, sherbets, ices, icings, cream cheese, bakery products, confectionery products, etc., of desirable body and texture and also in producing pharmaceutical, cosmetic and other preparations, it has been customary to utilize various ingredients or combinations thereof such as gelatin, albumen, sodium alginate, algin, pectin, agar, Irish moss, gum arabic and psyllium seed and, to a lesser extent, products of the nature of gum tragacanth and India gum.

These materials are not only quite expensive but furthermore it is difficult to obtain in many food products a desirable combination of physical characteristics such as proper viscosity, body and texture and stable foam characteristics.

An object of the present invention is therefore to provide a stabilizer and ingredient for food and other products and particularly for frozen desserts such as for ice cream, bakery of confectionery products which will supply at low cost good body, texture and viscosity as well as other desirable physical characteristics such as unusual foam characteristics.

Another object is to provide stabilization and desirable physical characteristics for other compositions by economical and readily available means.

A still further object is to provide a novel oat product having unusual physical characteristics capable of accomplishing these desired results when added to water, milk or other aqueous compositions as well as a method for producing the said novel oat product.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and extracted with a fat solvent to render it substantially fat free by which is meant that at least 75% of its fat has been removed, it may be incorporated as an ingredient and stabilizer in food and other products to give such products excellent body, texture and viscosity as well as unusual foam characteristics.

These unusual physical properties are not to be found in the oat grain as a whole or in ordinary oat products, as for example, in oat flour made by grinding oat groats or in pulverized oats or oat hulls. These properties are particularly developed when a special fraction of the oat grain is removed from the balance of the oat grain and subjected to fat extraction.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

The coarse residue which is left after such grinding and screening or bolting or after aspirating is then ground and is found to contain the most desirable properties for incorporation in food products such as in ice cream or other frozen desserts as the stabilizer. This effect is fully set forth in copending application, Serial No. 510,831 filed November 17, 1943.

It has, however, been found that by extracting substantially all of the fat from this unusual coarse oat fraction, the residue thereby obtained in finely divided form shows greatly increased viscosity characteristics over the unextracted product.

For example, by extracting substantially all of the approximately 6% to 8% of fat contained in the coarse oat fraction, the fat extracted fraction shows viscosity characteristics that are several times the viscosity of the unextracted product.

The following test was conducted using a standardized and calibrated 50 cc. pipette. Ten grams of the product were added to 125 cc. of water at 120° F. followed by mixing for 1 minute. The mixture was then allowed to stand for the period of time indicated and there was determined the number of seconds required for the mixture to flow out of the bulb of that calibrated pipette, the more seconds required for the flow through the bulb, the higher the viscosity.

*Number of seconds required to flow out of the bulb of calibrated 50 cc. pipette*

|  | After standing 10 minutes | After standing 20 minutes | After standing 30 minutes |
| --- | --- | --- | --- |
|  | Seconds | Seconds | Seconds |
| Unextracted finely divided special oat fraction | 30.5 | 42.5 | 73 |
| Fat extracted (hexane) finely divided special oat fraction | 51.0 | 93.5 | 155 |

At the same time, by extracting substantially all of the fat contained in the special coarse fraction of oats, the residue may be readily pulverized so that it will go through a much finer mesh as, for example, it may be easily pulverized to a point where all of the residue will go through a 90 to 100 mesh screen. The fat extracted product is much whiter in color and is quite free of positive odor and flavor.

It has furthermore been observed that the fat extracted residue has unusual foam characteristics so that the fat extracted product upon admixture in water or similar aqueous medium such as milk foams up to a high degree and in view of the high viscosity characteristics of the product, the foam is retained in a substantially stable form.

For example, where 5% to 10% of the extracted coarse residue in finely divided form is agitated in water at about 125° F. for a period of about one minute the foam constitutes practically all of the resultant mixture and this foam is quite stable so that there is very little separating out. This is particularly true where substantially all of the fat has been extracted from the special oat fraction.

This effect is not evident or evidenced when the whole oats are ground and fat extracted or when the oat flour made by grinding oat groats is fat extracted and utilized because of the fact that other constituents therein render ineffective the unusual stabilizing or gummy properties of the ground, relatively high protein and relatively low starch containing dehulled oat fraction of the present invention.

In the preferred procedure the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspirating until the relatively high starch material has been largely removed leaving the relatively high protein fraction behind.

The coarse fraction obtained will have a protein content in excess of 20% and more desirably in excess of 22%. At the same time the starch content of the coarse fraction will be reduced to much less than the starch content of the fine fraction.

According to one method of separating this relatively high starchy fraction, the groats are ground so that a major proportion thereof, say at least 50% to 80%, will have a fineness in excess of about 60 mesh.

Then the ground material is screened, preferably through a fine silk screen or aspirated to remove all particles which will not go through a 60 mesh screen.

A most highly desirable method is to grind the oat groats until over 75%, and desirably between 80% and 90% will go through a 70 mesh screen but wherein the balance of between 10% and 20% remains on the screen. Then the ground groats are aspirated or screened to remove all the coarse particles and to separate the fine fraction comprising 80% to 90% from the coarse fraction comprising the balance of 10% to 20% which coarse fraction is used for fat extraction in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then subjected to fat extraction. Among the solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized and finely divided to the desired point of at least about 75 mesh and desirably to about 90 mesh.

It is preferable during the preparation or extraction of the special oat fraction that the material in dry form be not heated to a temperature much in excess of about 170° F.

This material although very different in composition, qualities and chemical structure from gelatin, sodium alginate, algin, pectin, Irish moss and psyllium seed, when added to a food product results in giving the food product most desirable physical qualities.

Moreover, the stabilizing action given by this particular fraction of oats is given by neither the oat flour produced by grinding oat groats nor by starch.

Moreover, the product produced in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Furthermore, the fat extracted residue prepared in accordance with the procedures of the present invention shows much higher stabilizing value even than the unextracted material.

The extracted special fraction of oats is also found to go into aqueous dispersion very much more readily than the unextracted material. Special advantages are particularly observed where added to aqueous compositions such as to an ice cream mix since no apparent sediment of dark particles is found and a much whiter product is obtained.

Although the chemical composition may vary, it has been found that at least 20% protein should be present and most desirably at least 22% protein. Highly desirable materials have been made containing 25% to 29% protein.

By the term "dry milled oat product" as used in the present application and claims is meant an oat product which has been subjected to either grinding, screening, bolting, aspirating or combinations thereof and to oil solvent extraction but wherein the oat product has been processed in the substantial absence of water.

The fat extracted special fraction of oats made by the present invention is used as a stabilizer and ingredient for food products and particularly for frozen desserts such as ice cream, sherbets and ices, ice milk and similar compositions.

In the case of ice cream, the fat extracted special oat fraction is added to the ice cream mix desirably before pasteurizing and homogenizing. The addition is preferably made while the mix is still cool and at a temperature of not exceeding 100° F. Where desired, the finely divided fat extracted special oat fraction may be mixed with about 4 parts of its weight of a dry sugar followed by adding the combination to the mix. The pasteurization temperature may be between about 145° F. and 165° F. to 170° F. and preferably the higher temperature ranges of 160° F. to 170° F.

In the case of sherbets, ices and other similar frozen dessert compositions the finely divided fat extracted special oat fraction of the present invention may be added directly to the mix or a combination may first be prepared of 1 part of the special oat fraction with 1 to 4 parts of sugar and 2 to 5 parts of water or milk or skim milk followed by heating to about 145° F. to 170° F. and then added to the sherbet, fruit ice or ice mix in the normal manner and in the desired proportion.

The fat extracted special oat fraction of the present invention may be used with frozen dessert compositions and particularly with ice cream in the production of any flavor or frozen dessert such as in the production of strawberry ice cream, chocolate ice cream, peach ice cream, vanilla ice cream, etc.

Furthermore, the finely divided fat extracted special oat fraction may be added to cream before freezing where the cream is subsequently to be used in the manufacture of ice cream or other similar frozen dessert or may be added to the fruit such as to strawberries, peaches, etc., in a minor amount of less than 2% and desirably between 0.1% and 0.75% at the time the fruits are frozen.

Particularly by the fat extraction procedure of the present invention the resultant fat extracted residue will not readily deposit any sediment after admixture with aqueous compositions. For example, where 0.5% to 0.7% of the finely divided, fat extracted, special oat fraction of the present invention is added to an ice cream mix this residue mixes in easily with the ice cream mix composition and upon homogenizing no residue forms on the homogenizer screens. Furthermore, the finished ice cream mix upon subjecting to a sedimentation test will be comparatively free of dark specks. Also, by reason of the whiter color and substantial absence of odor and flavor, higher proportions of the composition of the present invention may be employed.

The finely divided, fat extracted, special oat fraction of the present invention may be used for addition to aqueous food compositions or to food compositions containing a minor amount of water or similar aqueous medium with or without short or prolonged heating to obtain unusual thickening, gelatinous, foamy and gummy characteristics.

As little as 0.05% to 2% of the finely divided fat extracted, special oat fraction of the present invention may be utilized to develop unusual physical stabilizing characteristics and where desired even higher amounts may be employed such as up to about 5% to 10% although it is preferable to use not over about 2% against the weight of the food product.

For example, in the manufacture of icings, the finely divided, fat extracted, special oat fraction may be added to the icing composition in an amount of less than about 2% in lieu of pectin, algin, gelatin or similar stabilizer.

In the manufacture of cream cheese, the finely divided, fat extracted, special oat flour may be used in an amount of between 0.5% and 1.5% in replacement for locust bean gum to retard syneresis, to give stabilization and fine body and texture and smoothness to the cream cheese.

In the manufacture of candies and confections the finely divided, fat extracted, special oat fraction may be used in chocolate coatings to give improved spreading and dipping qualities to the chocolate and to retard blooming. The finely divided, fat extracted, special oat fraction may also be used in fondants, gum drops, cream and marshmallow fillings, nougats, as well as for other candy and confectionary products to give unusual thickening and stabilization characteristics.

In marshmallow fillings and syrups the finely divided, fat extracted special oat fraction may be employed in replacement for corn syrup to give a high quality marshmallow product on the basis of using, for example, from 0.3% to 1.5% of the finely divided, fat extracted, special oat fraction in lieu of 10% or more of the corn syrup normally employed.

Similarly in the manufacture of jams and jellies, fruit icings and similar compositions, the finely divided, fat extracted, special oat fraction of the present invention may be employed in place of the more expensive gums to give high stabilization characteristics.

The finely divided, fat extracted, special oat fraction may also be utilized for bakery purposes such as for pie fillings, custards and puddings and where desired the results of the present invention may be obtained without substantial gelatinization or without heating to a temperature of 160° F. or more.

The stabilizing effect may also be obtained in the preparation of relishes or in processed cheeses such as pimento type cheeses as well as in salad dressings including mayonnaise, salad dressings, relish spreads, French dressing, etc.

A small amount, desirably not over 2% and preferably 1% or less, of the finely divided, fat extracted, special oat fraction is added to the food compositions.

In an ice cream or similar frozen dessert generally the preferred amount to be used is between 0.5% and 0.75% against the total weight of the mix, that is, against the total weight of all the ice cream ingredients such as the milk, sugar, flavoring and other materials used. For example, between 5 pounds and 7½ pounds of the finely divided, fat extracted, special oat fraction are added to each 1000 pounds of ice cream mix. In the case of sherbets and ices a slightly higher proportion may be used up to about 1% of the total weight of the mix ingredients.

The other components of the frozen dessert mix may be retained as normally used, which ingredients comprise milk solids, butterfat, whole milk, condensed milk, skim milk, sugar (including cane or corn or both) and flavoring materials such as fruits.

The finely divided, fat extracted, special oat fraction which is prepared in accordance with the procedures of the present invention may also be added to the fruits at the time they are frozen, such addition being made in the small amount of less than 2% or the finely divided, fat extracted, special oat fraction may be added to cream before the cream is frozen, or to any other one of the ice cream or frozen dessert ingredients so that when the fruit or the frozen cream or the ice cream ingredient containing the finely ground, fat extracted, special oat fraction is incorporated in the ice cream mix, the ice cream mix will contain as an ingredient and stabilizer a small amount of the finely divided, fat extracted, special oat fraction herein described.

In some cases as little as 0.05% will give a good stabilizing effect but the preferred amounts to use are in the neighborhood of 0.6% against the total weight of the ice cream mix and preferably between 0.5% and 0.75%.

The food product made by the use of a small amount of the finely divided, fat extracted, special oat fraction as an ingredient and as the stabilizer will have an excellent body and texture and viscosity.

It has been found particularly desirable for the finely divided, fat extracted, special oat fraction to be added to aqueous products containing at least 10% of a sugar such as of dextrose, sucrose, glucose, lactose, etc., and desirably 40% to 50% or more of sugar followed by heating to an elevated temperature of at least 150° F. and desirably to a temperature of between 190° F. and 210° F. or more to develop unusual plastic and viscous properties. This composition may, for example, be utilized with or without gelatin as a coating for meats such as for bacon, hams, meat loaves, etc., to obtain moistureproofness, and firm body and texture characteristics.

Furthermore, for example, in the manufacture of icings, the finely divided, fat extracted, special oat fraction is desirably added to the icing mix containing the sugar in aqueous solution, the addition being made in a small percentage of less than about 2% followed by heating in order to develop high viscosity and plasticity. This unusual viscosity and plasticity are particularly desirable in many food products such as in icings, jams, fruit ripples for ice cream, bakery and confectionery products, etc.

The fat extracted special oat fraction may also be added in a small amount to meat products such as meat loaves, sausages, ground meats, etc., where high viscosity characteristics, high water imbibing properties and firm body and texture are desired. The fat extracted special oat fraction may also be employed along with gelatin as a coating on meats to give moistureproofness and firm body and texture to the outside of meats. A combination of the product of the present invention and gelatin may, for example, be utilized as a dipping medium for meats and there may also be present in this dipping medium a minor amount of a sugar.

Where desired, there may be combined with the fat extracted special oat fraction a minor amount of other special stabilizing ingredients such as the mono-glycerides or di-glycerides.

The special, novel, fat extracted oat fraction of the present invention also has been found to be of great value in increasing the viscosity of aqueous compositions and solutions such as in water, milk, or the like, and which aqueous compositions may contain starch, sugar, sulfonated oils, printing inks, soaps or other materials and which increased viscosity is obtained even within wide ranges of pH such as between pH 2 and pH 10. It has particularly been found that where the composition of the present invention is subjected to higher pH's such as to between pH 8.0 and pH 10.0 that much higher viscosity characteristics are observed.

The viscosity of aqueous compositions containing the fat extracted special oat fraction herein described increases markedly upon standing even at room temperature and without an elevated temperature treatment. For example, it has been found that when the fat extracted special oat fraction prepared in accordance with the procedures of the present invention is suspended in water or similar aqueous medium with or without short or prolonged heating, an unusual thickening, gelatinous and gummy suspension is formed having many useful properties and which may be used as a thickening or stabilizing agent or gum in food products, pharmaceutical products, as a sizing for paper and textiles or as a stabilizing agent in physical two phase systems.

For example, the fat extracted special oat fraction of the present invention may be used in the preparation of cosmetics as for hand lotions, face creams, for baths or for application where a high viscosity and adhesiveness are desired. For example, from 2% to 15% of the fat extracted special oat fraction may be dispersed in water preferably with agitation and used as a bath for cosmetic or dermatological purposes.

Similarly in the manufacture of pharmaceutical emulsions and cosmetic preparations the finely divided, fat extracted, special oat fraction may be employed in place of the expensive gums to give high stabilization characteristics. For example, from 2% to 15% of the finely divided, fat extracted, special oat fraction of the present invention may be used in the preparation of hand lotions, facial or skin creams or lotions, foot-ease powders, or other cosmetic preparations, the finely divided, special oat fraction giving smooth viscosity and excellent spreading qualities as well as smoothness to the skin, bleaching effects and other desirable qualities.

Furthermore, the composition of the present invention may be employed for addition to gauze or bandages so that where the gauze or bandage containing the present composition is immersed in water high viscosity characteristics, adhesiveness, and coating characteristics are obtained so that such gauze can be applied to the affected portion of the body with highly desirable results.

Furthermore in printing inks the present composition may be employed to provide a medium of high viscosity to use as a carrier for inks and in the textile industry may be employed to deepen the color of the textiles and to provide good body characteristics.

Where used for pharmaceutical preparations there may be combined with the dispersed, fat extracted, special oat fraction such products as zinc stearate, lanolin, or in connection with such products or other pharmaceutical or dermatological products there may be combined therewith bactericidal or fungicidal agents such as thymol, sodium benzoate, etc.

The unusual thickening and stabilizing effect is particularly shown upon the addition of the finely divided, fat extracted, special oat fraction of the present invention to an aqueous composition or material such as to water, milk, cream, fruit juices, water dispersions as, for example, used in the textile or pharmaceutical industries and where the pH of the aqueous composition, or, in the case of emulsions, where the pH of the external phase is within the range of pH 2.0 and pH 10.0. This wide range enables the finely divided, fat extracted, special oat fraction to be used in agricultural spray emulsions, leather, paper and resin emulsions, cosmetic and drug emulsions, etc.

The fat extracted special oat fraction of the present invention is utilized not only for its high viscosity characteristics but also for its high foam characteristics, which foam combined with the high viscosity is rendered much more stable than where foam alone is obtained without the high viscosity that is given by the product of the present invention.

It has also been found highly desirable for the special oat fraction of the present invention to be subjected to gelatinization or disruption of its starch cells prior to use as a stabilizing ingredient, water absorbing agent, and special gum constituent. The gelatinization of the special oat fraction or disruption of starch cells may be conducted by subjecting the special oat fraction to high temperature and pressure with a sudden release of pressure such as by subjecting the fraction to between 50 pounds and 250 pounds pressure per square inch at temperatures of over 250° F. followed by sudden release of the pressure. The special oat fraction may also be steamed by moistening and placing between heated rollers as well as by any other usual manner of starch cell disruption. The starch disrupted special oat fraction even without fat extraction may be utilized as a high water imbibing or water absorbing agent, gum and stabilizing fraction.

The starch disruption or gelatinization procedure may also be applied to the special oat fraction after fat solvent extraction or where desired the special oat fraction may first be gelatinized followed by fat solvent extraction in accordance with the procedures outlined by the present invention.

The present application is a continuation in part of applications, Serial No. 401,967 filed July 11, 1941, entitled "Water thickening agents and methods of making the same," Serial No. 463,651 filed October 28, 1942, entitled "Ice cream compositions," and Serial No. 510,831 filed November 17, 1943, entitled "Food composition."

By the term "total protein" as used in the claims of this application is meant the total amount of protein present in the special oat fraction of the present application. By the term "small amount" is meant a relatively small percentage of less than about 10%.

Having described my invention, what I claim is:

1. A food composition comprising as an ingredient a small amount of a dry milled, substantially fat free oat product, said oat product containing in excess of about 20% total protein and said oat product having a relatively low starch and a relatively high protein content as compared to dehulled oats.

2. A frozen dessert composition comprising as a stabilizer a small amount of a finely divided, dry milled, substantially fat free oat product, said oat product containing in excess of about 20% total protein and said oat product having a relatively low starch and a relatively high protein content as compared to dehulled oats.

3. A confectionery composition comprising as an ingredient a small amount of a dry milled, substantially fat free oat product, said oat product containing in excess of about 20% total protein and said oat product having a relatively low starch and a relatively high protein content as compared to dehulled oats.

4. A food composition comprising as an ingredient a small amount of the finely divided, substantially fat free, coarse fraction of dehulled oats, said coarse oat fraction being substantially free of those particles which will go through a 60 mesh screen when the dehulled oats are pulverized to a fineness that will permit a major proportion thereof to pass through a 60 mesh screen.

5. A food composition comprising as an ingredient a small amount of the finely divided, substantially fat free, coarse fraction of dehulled oats, said coarse oat fraction being substantially free of those particles which will go through a 60 mesh screen when the dehulled oats are pulverized to a fineness that will permit 80% to 90% thereof to pass through a 60 mesh screen.

6. A frozen dessert composition comprising as an ingredient an amount of less than 1% of the substantially fat free coarse fraction of dehulled oats, said coarse oat fraction being substantially free of those particles which will go through a 60 mesh screen when the dehulled oats are pulverized to a fineness that will permit 80% to 90% thereof to pass through a 60 mesh screen.

7. A substantially fat free, dry milled oat product, said oat product containing in excess of about 20% total protein and said oat product having a relatively low starch and a relatively high protein content as compared to dehulled oats.

8. The finely divided, substantially fat free, coarse fraction of dehulled oats, said coarse oat fraction being substantially free of those particles which will go through a 60 mesh screen when the dehulled oats are pulverized to a fineness that will permit a major proportion thereof to pass through a 60 mesh screen.

9. The substantially fat free, coarse fraction of dehulled oats, said coarse oat fraction being substantially free of those particles which will go through a 60 mesh screen when the dehulled oats are pulverized to a fineness that will permit 80% to 90% thereof to pass through a 60 mesh screen.

10. A method of producing a novel oat product which comprises dehulling oats, pulverizing the groats into two fractions, which two fractions consist of a minor proportion of coarse particles as one fraction and a major proportion of fine particles as another fraction, separating the minor proportion of coarse particles, and then substantially removing the fat from the coarse particles and recovering the substantially fat free residue as the novel oat product.

11. A method of producing a novel oat product which comprises dehulling oats, pulverizing the groats into two fractions which two fractions consist of a minor proportion of coarse particles as one fraction, said coarse fraction constituting 10% to 20% of the pulverized oat groats, and a major proportion of fine particles as another fraction, said fine fraction constituting 80% to 90% of the pulverized oat groats, separating the fraction which consists of the coarse particles, and then substantially removing the fat from the coarse particles and recovering the substantially fat free residue as the novel oat product.

12. A method of producing a novel oat product which comprises dehulling oats, pulverizing the groats until a major proportion thereof will have a fineness in excess of about 60 mesh, aspirating the pulverized groats to separate the minor proportion of the coarse particles from the major proportion of the fine particles, and then substantially removing the fat from the coarse particles and recovering the substantially fat free residue as the novel oat product.

13. A method of producing a novel oat product which comprises dehulling oats, pulverizing the groats until 80% to 90% thereof will have a fineness in excess of about 60 mesh, aspirating the pulverized groats to separate the coarse particles from the 80% to 90% proportion of fine particles, and then substantially removing the fat from the coarse particles and recovering the substantially fat free residue as the novel oat product.

SIDNEY MUSHER.